United States Patent
Boman et al.

(10) Patent No.: US 7,194,255 B2
(45) Date of Patent: Mar. 20, 2007

(54) SYSTEM AND METHOD OF MEDIA CONTENT DISTRIBUTION EMPLOYING PORTABLE MEDIA CONTENT DISTRIBUTION DEVICE

(75) Inventors: Robert C Boman, Thousand Oaks, CA (US); Ted H Applebaum, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 658 days.

(21) Appl. No.: 10/346,641

(22) Filed: Jan. 17, 2003

(65) Prior Publication Data
US 2004/0203663 A1    Oct. 14, 2004

(51) Int. Cl.
*H04M 3/42*   (2006.01)
*H04Q 7/22*   (2006.01)
*H04Q 7/38*   (2006.01)

(52) U.S. Cl. .............................. 455/414.1; 455/414.2; 455/414.3; 455/414.4; 455/556.2

(58) Field of Classification Search ..................... None
See application file for complete search history.

(56) References Cited

U.S. PATENT DOCUMENTS

| | | | |
|---|---|---|---|
| 3,755,818 A * | 8/1973 | Greenspan ................... 455/507 |
| 2002/0023258 A1* | 2/2002 | Elwahab et al. ............. 717/122 |
| 2002/0042278 A1* | 4/2002 | Crockett et al. ............. 455/456 |
| 2002/0160759 A1* | 10/2002 | Pradhan et al. .............. 455/414 |
| 2003/0083024 A1* | 5/2003 | Richenstein et al. ........... 455/99 |
| 2004/0198335 A1* | 10/2004 | Campen ...................... 455/419 |
| 2004/0203893 A1* | 10/2004 | Kotzin ..................... 455/456.1 |

* cited by examiner

*Primary Examiner*—Duc M. Nguyen
*Assistant Examiner*—Matthew Genack
(74) *Attorney, Agent, or Firm*—Harness, Dickey & Pierce, PLC

(57) ABSTRACT

A media content distribution system includes a portable device operable to store media content, wirelessly receive input signals, select a portion of the media content based on the input signals, and communicate the selected portion to a user. The system further includes a signaling mechanism disposed at a location and producing an input signal in a range respective to the location. The input signal is selected to ensure that the selected portion of media content includes information relating to the location when the portable device is disposed within the range.

34 Claims, 6 Drawing Sheets

SYSTEM AND METHOD OF MEDIA CONTENT DISTRIBUTION EMPLOYING PORTABLE MEDIA CONTENT DISTRIBUTION DEVICE

FIELD OF THE INVENTION

The present invention generally relates to information distribution systems, methods, and devices, and particularly relates to systems and methods of media content distribution employing a portable media content distribution device.

BACKGROUND OF THE INVENTION

Public areas, such as airports, zoos, and museums, often deploy information kiosks that serve to inform people about local restaurants, taxis, and other services and attractions. While these kiosks are useful for distributing media content to users, their functionality is limited because a person must be physically present at specific kiosk locations to use them. In contrast, a portable media distribution device that a user carries and that functions to distribute information about point of interest in a given range with respect to the point of interest would be more useful.

Some services have arisen that provide information to wirelessly connected Personal Digital Assistants (PDAs) and cell phones with GPS tracking capability that provide information to users based on user location. Examples of such services include WebToGo, and Cell-Loc. These services are disadvantageous in that users must own expensive devices to make use of them, and these devices are generally too expensive to rent or freely distribute to users. These devices are also useful in other contexts, and therefore attract theft. Further, the services require vendors and purveyors of attractions and other points of interest to purchase cellular network services, and this requirement is relatively cost prohibitive.

The need remains, therefore, for a system and method of media content distribution that utilizes portable devices that are relatively inexpensive and/or have a dedicated use that renders them suitable for rental or free distribution. The present invention fulfills this need.

SUMMARY OF THE INVENTION

In accordance with the present invention, a media content distribution system includes a portable device operable to store media content, wirelessly receive input signals, select a portion of the media content based on the input signals, and communicate the selected portion to a user. The system further includes a signaling mechanism disposed at a location and producing an input signal in a range respective to the location. The input signal is selected to ensure that the selected portion of media content includes information relating to the location when the portable device is disposed within the range.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
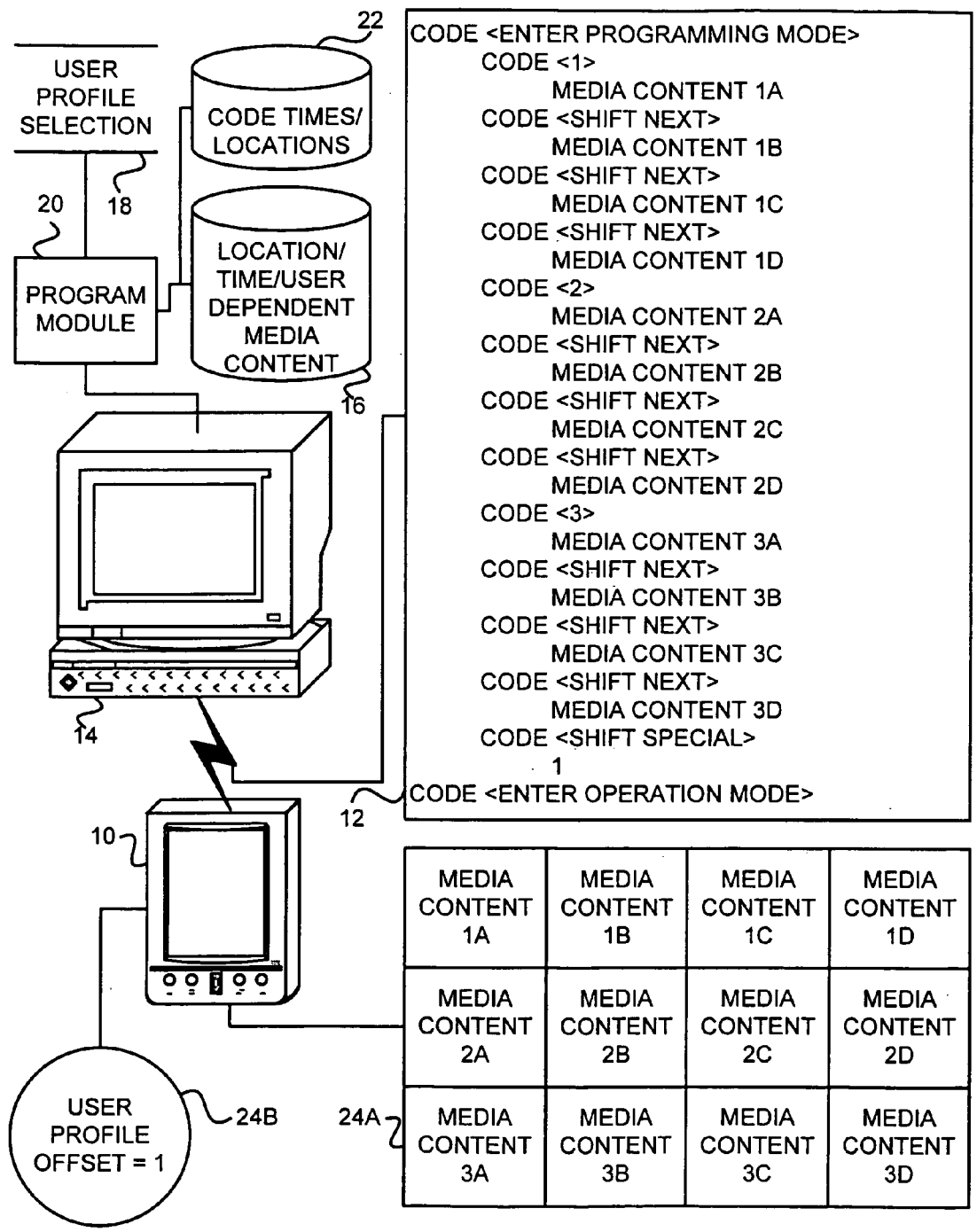
FIG. 1 is a partial perspective block diagram depicting storage of media content in a portable device in accordance with the present invention.

Portable device 10 of FIG. 1 is modeled on an MP3 player with an expanded interface and addition of a relatively short range (compared to a cell link) wireless data link (Bluetooth, radio frequency, etc.). It is subject to being programmed by input signals 12 provided by programming station 14 under operation by a device programmer. Alternatively, programming can be accomplished by wire. Accordingly, a device programmer supplies media content 16 relating to various locations corresponding to points of interest, and plural portions of media content relating to a particular point of interest may be authored with respect to different audiences, times of day, and/or events. According to various embodiments of the present invention, the device programmer can also supply a user profile selection 18 for a particular device 10, and thus cause the particular device 10 to deliver media content authored for a particular type of audience. This functionality can be extended to provide a security measure preventing a user from receiving media content not authored for the audience to which the user belongs, and thus prevent intentional and accidental switching of the user profile by the user. In response to instructions from the device programmer, program module 20 produces input signals 12 based on data 22 relating to times and/or locations associated with various points of interest, and based on dedicated programming code sets for programming device 10.

Input signals 12 received by device 10 have a sequence dictating storage of media content 16 in memory 24A of device 10, and storage of a user profile offset in memory 24B of device 10. The exemplary input signals 12 of FIG. 1 have a sequence in accordance with alternating pairs of portions of media content being authored with respect to different times, events, and/or selections of a user. They also have a sequence in accordance with alternating portions of media content being authored with respect to different audiences. Thus, portions of media content in the first row of memory 24A may, for example, correspond to daytime content for an adult, followed by daytime content for a child, followed by nighttime content for an adult, followed by nighttime content for a child. Notably, daytime and nighttime content can be the same for one point of interest, and different for another; the same can be true of adult and child content.

Figure 2:
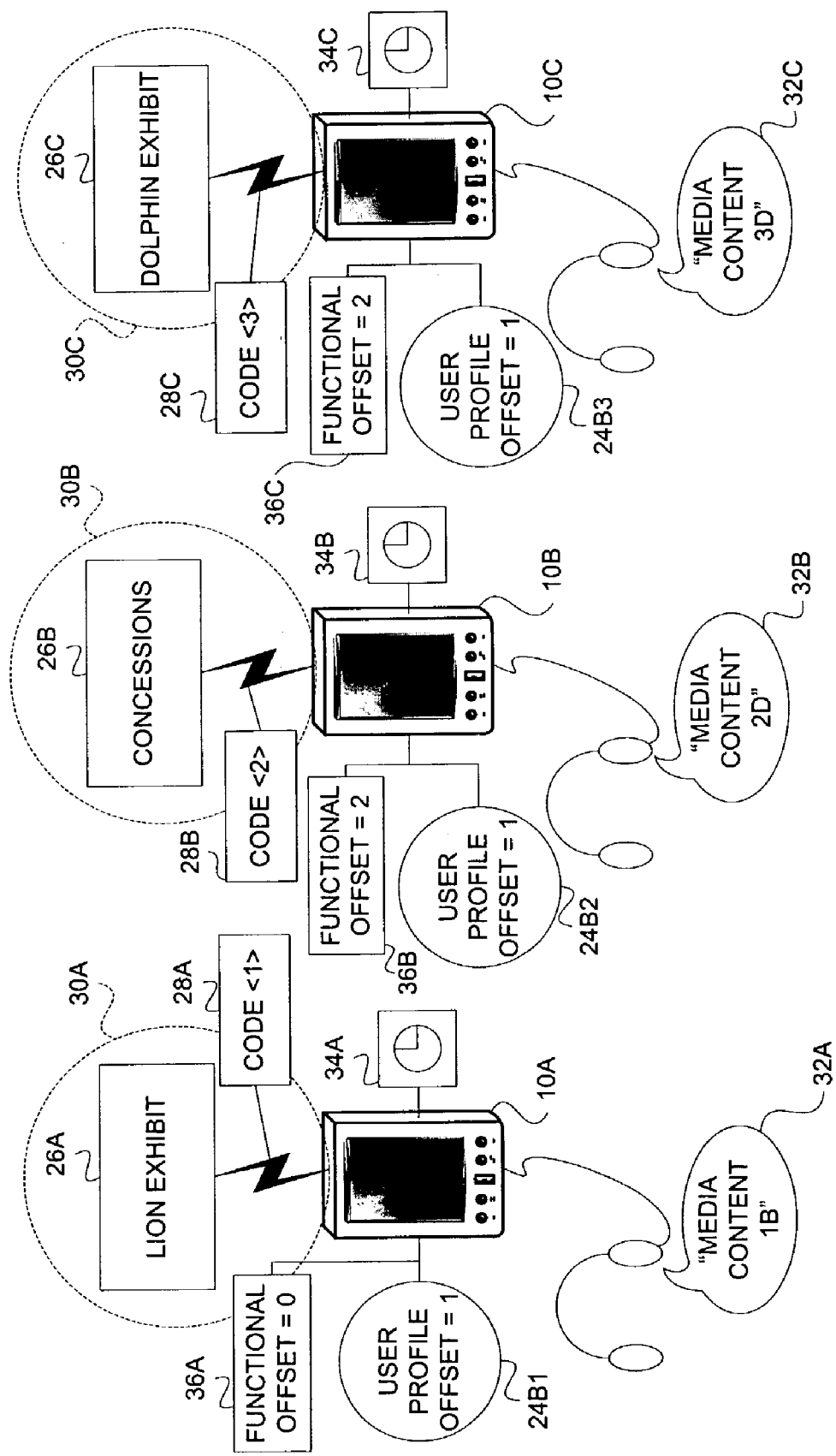
FIG. 2 is a partial perspective block diagram depicting media content distribution according to a first embodiment of the system of the present invention.

FIG. 2 demonstrates an exemplary implementation of the system of the present invention at a plurality of locations 26A, 26B, and 26C having wireless signaling mechanisms (Bluetooth, radio frequency, etc.) disposed therein, and producing input signals 28A, 28B, and 28C in ranges 30A, 30B, and 30C respective to the locations. In the present implementation, the input signals 28A–C are selected to ensure that selected portions of media content communicated to users as at 32A, 32B, and 32C include information relating to the locations when portable devices 10A, 10B, and 10C are disposed within the corresponding ranges 30A–C. Timekeeping mechanisms 34A, 34B, and 34C provided to devices 10A–C serve as time indicators providing functional offsets 36A, 36B, and 36C, which are further useful for retrieving information relevant to a particular point of interest at a particular point in time.

In an example where locations 26A–C correspond to points of interest at a zoo equivalent to a lion exhibit, concessions, and a dolphin exhibit, respectively, and where the functional offset serves to indicate whether it is time for a dolphin show, the system operates as follows. Device 10A, receives code <1> from the lion exhibit and differentiates between the various locations based on the input signal, thereby identifying media content 1A–D relating to the lion exhibit. Device 10A further uses functional offset 36A to differentiate between media content for different times, thereby identifying media content 1A–B. Device 10A further uses user profile offset in memory 24B1 to differentiate between media content for various audiences, thereby identifying media content 1B and communicating it to the user. As a result, the user receives media content relating to, for example, lion eating habits. An adult user would, for example, have instead received media content 1A additionally relating to lion mating habits. If a dolphin show time had been indicated, the adult and child users would have received media content 1C–D, which would be the same as media content 10A–B since the lion exhibit is not affected by dolphin show times.

Further to the present example, device 10B in range 30B receives input signal 28B indicating code <2>, and thereby differentiates between the various locations to identify media content 2A–2D. Each portion of media content 2A–2D serves to communicate identical information about available concessions, with daily specials and other promotions being coordinated through daily reprogramming of the portable media distribution devices. In an alternative implementation, timekeeping mechanism 34B could be adapted to affect functional offset 36B based on date to promote daily specials.

Yet further to the present example, device 10c receives signal 28C indicating code 3 and thereby identifies media content 3A–D relating to the dolphin exhibit. Since functional offset 36C indicates a dolphin show time, media content 3C–D is identified. Media content 3D is finally chosen based on the user profile offset stored in memory 24B3. Thus, the child user receives information relating to the dolphin performance. If a non-show time had been identified, then media content 3A–B would have communicated an announcement relating to available show times.

Still further to the present example, ranges 30A–30D do not overlap, thereby ensuring that a portable device does not communicate a portion of media content to the user about one point of interest when in closer proximity to another point of interest. Alternative implementations, however, may permit certain ranges to overlap and provide the portable devices with an ability to communicate availability of multiple portions of media content to a user, perhaps as text labels on an active display. Then the devices can select an available portion of media content based on a user response, such as a selection of a text and/or audio label via a selection mechanism provided to a device.

Figure 3:
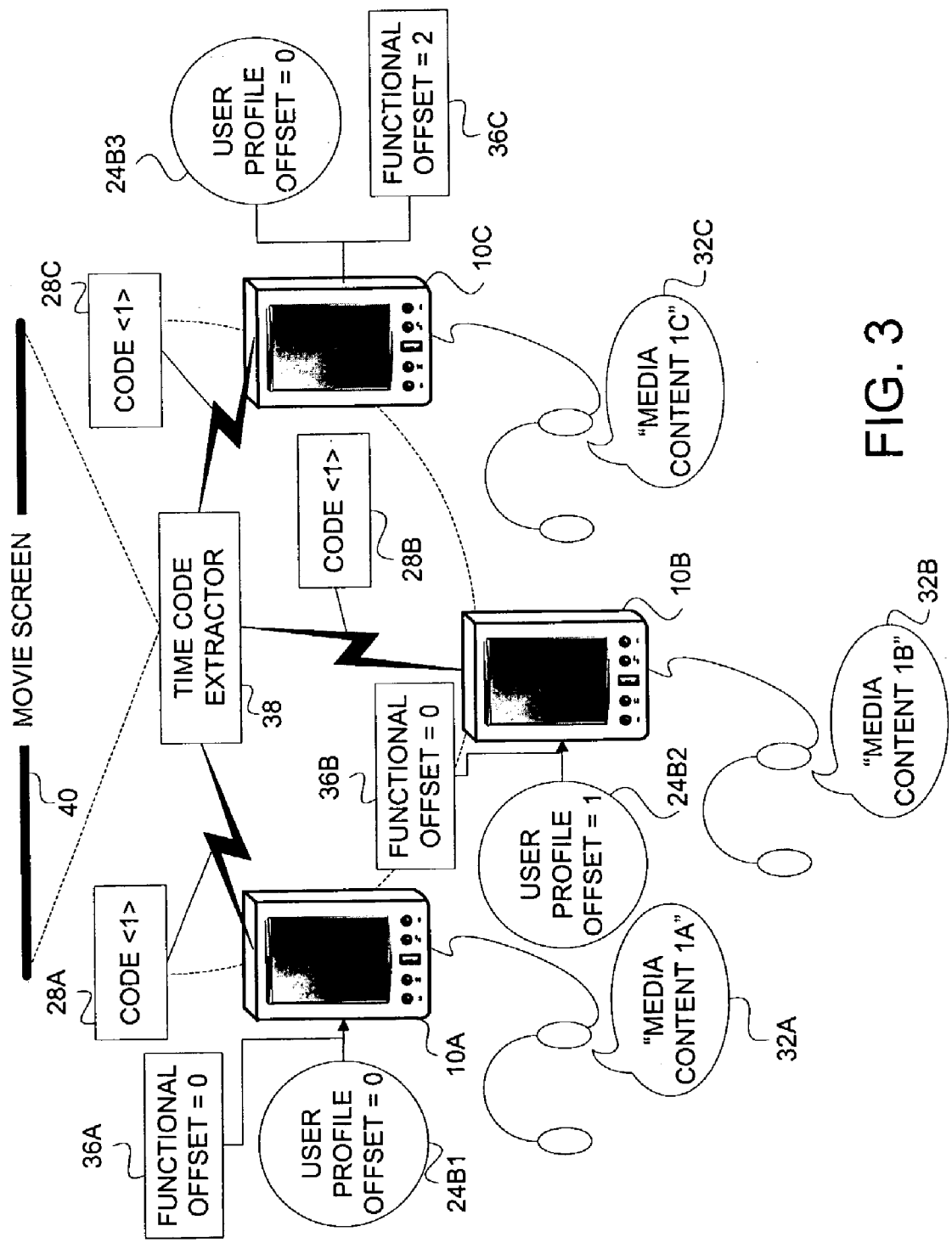
FIG. 3 is a partial perspective block diagram depicting media content distribution according to a second embodiment of the system of the present invention.

FIG. 3 displays another exemplary implementation of the present invention, wherein a movie theater provides portable devices to patrons wishing to hear a soundtrack of a viewed film, but with dialogue recorded in a foreign language. Thus, a Spanish-speaking adult may rent device 10A for himself, while renting device 10B for his Spanish-speaking child; a French-speaking adult may further rent device 10C. According to the present example, devices 10A–C have been programmed with secure user profiles in memories 24B1–B3, such that the child user receives censored dialogue at 32B, while the adult users receive uncensored dialogue at 32A and 32C. A selection mechanism provided to each device additionally allows the users to switch between languages by manipulating functional offsets 36A, 36B, and 36B. Since preferred language may be considered part of a user profile, this example further employs two user profile-related offsets, where one profile category is secure and the other is not.

Further according to the present example, the movie theater is provided with a time code extractor mounted, for example, in the theater ceiling, and operable to extract time codes encoded in film images displayed on a movie screen 40 using, for example, Veil technology. As a result, extractor 38 is operable to produce signals 28A–C based on actual event at different times at the point of interest, and devices 10A–C can therefore differentiate between times and/or events at the location based on the input signals. Accordingly, upon receiving an input signal at the start of the movie, devices 10A–C each retrieve a portion of soundtrack for a first reel of the film, and select different language and/or censored versions based on secure and unsecure offsets provided to devices 10A–C. Each additional extracted time code indicating a new reel of the film causes extractor 38 to produce a new signal selected to cause devices 10A–C to retrieve soundtracks for the appropriate reel of the film.

Figure 4:
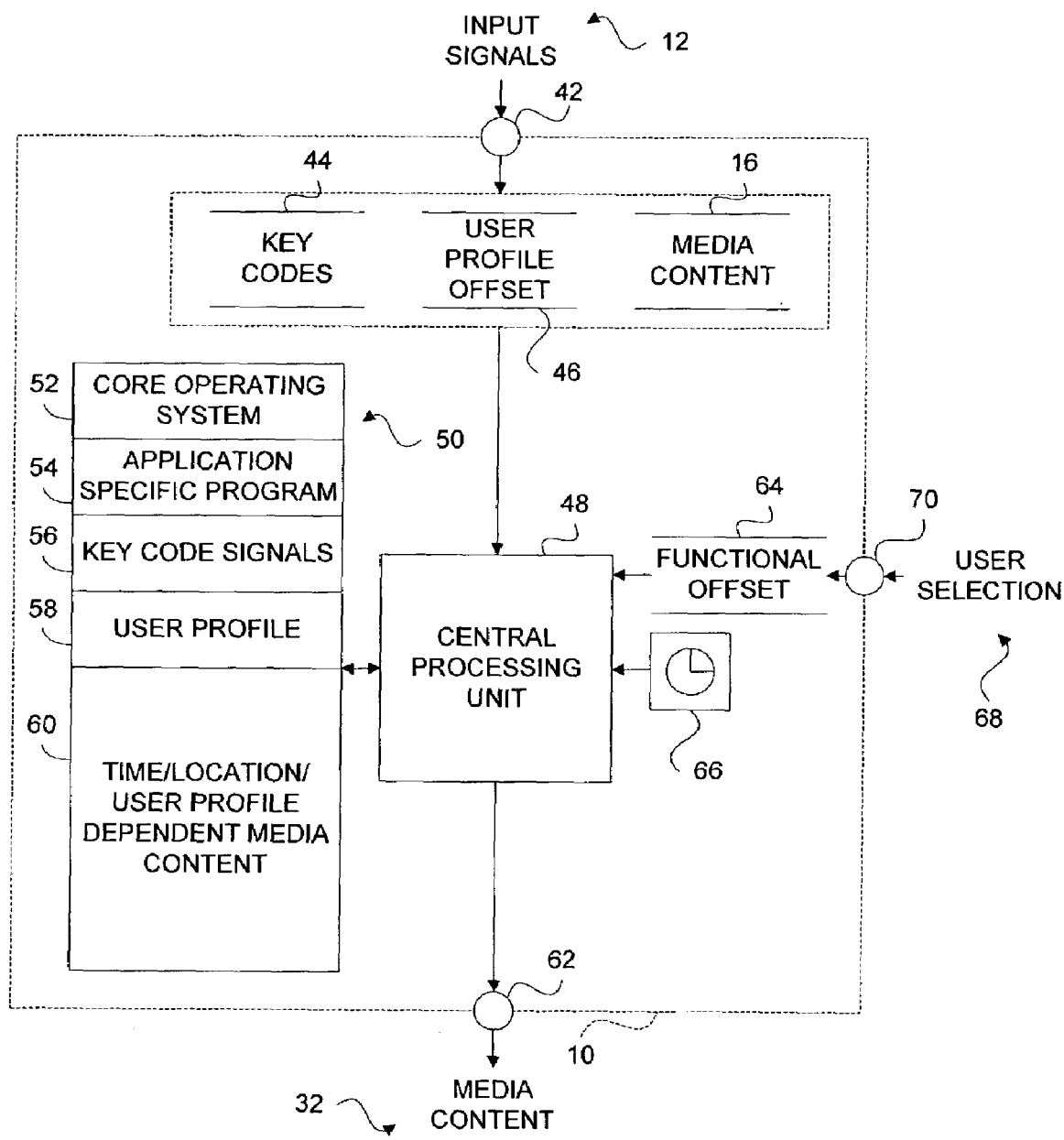
FIG. 4 is a schematic block diagram depicting a portable media content distribution device according to the present invention.

FIG. 4 illustrates the components of the portable media content distribution device 10 according to the present invention. It has a wireless input 42 receptive of input signals 12 comprising key codes 44, user profile offsets 46, and/or media content 16. Central processing unit 48 is adapted to access memory 50, which can include Random Access Memory (RAM), bit registers, hard disk storage, and/or flash memory. Core operating system 52, application specific program 54, and established key code signals 56 define the procedures for storing user profile offset 46 as a user profile 58 and media content 16 as stored media content 60 in accordance with input key codes 44. Core operating system 52, application specific program 54, and established key code signals 56 further define the procedures for selecting and communicating portions of media content via output 62, wherein the section occurs according to secure user profile 58 and functional offset 64, and functional offset 64 can be securely produced by timekeeping mechanism 66 and/or user selection 68 communicated by selection mechanism 70. Additional components may be incorporated into device 10 to implement additional functions, such as a paging function for use at restaurants.

Figure 5:
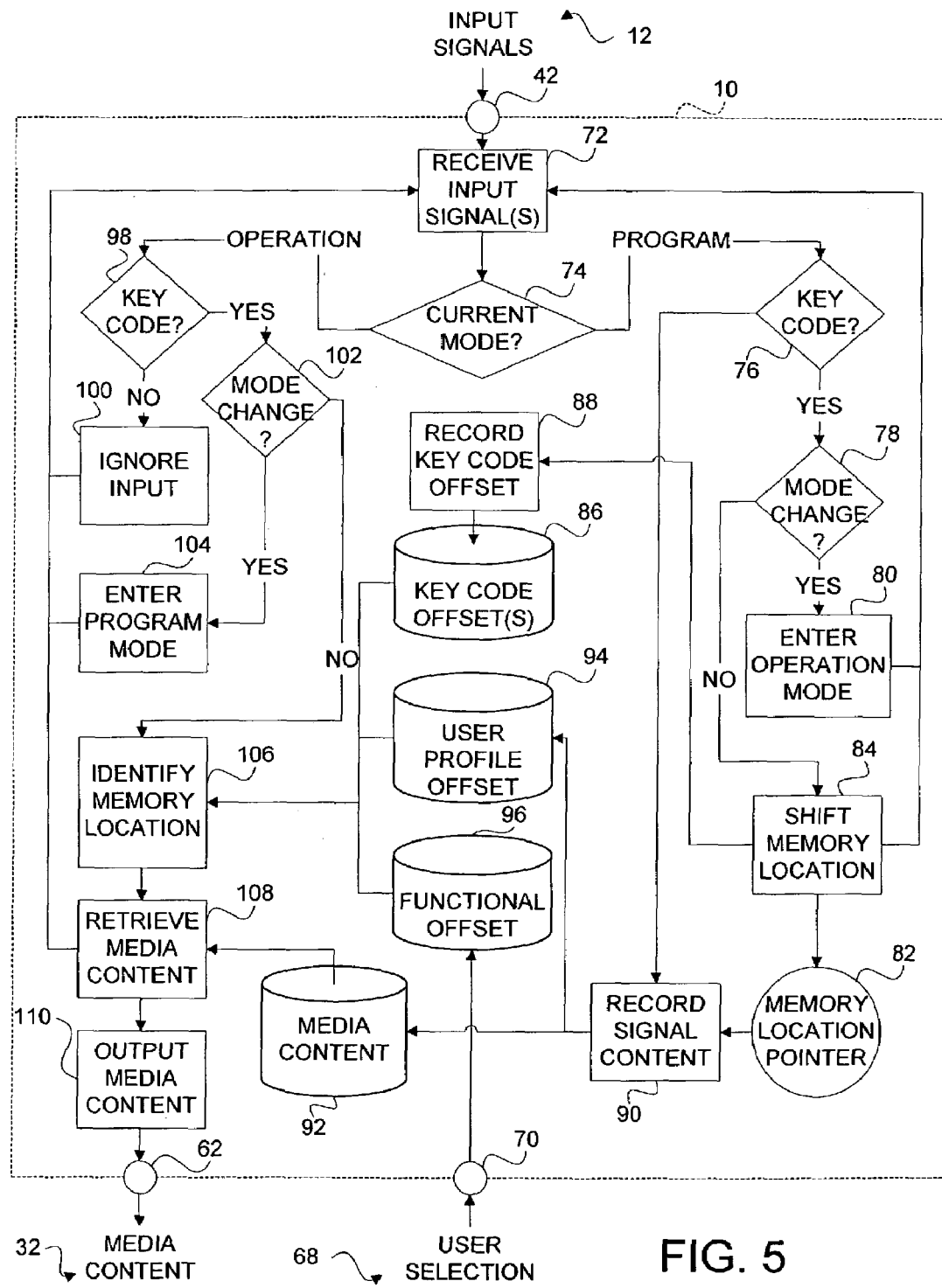
FIG. 5 is a block and flow diagram depicting a method of operation for a portable media content distribution device according to the present invention.

FIG. 5 details the method of operation for device 10 according to the present invention. Input signals 12 are received at 72 via wireless input 42, and processing of those signals 12 depends on whether device 10 is in an operation mode or a programming mode as at 74. When in the program mode, device 10 determines whether the received signal is a key code at 76 and, if so, whether the key code signals a mode change as at 78. If so, device 10 enters operation mode at 80 and receives new signals at 72. If not, device 10 shifts memory location pointer 82 to an appropriate memory location at 84 and records a corresponding key code offset 86 at 88. Processing then returns to 72, and if a non-key code is received during program mode as at 76, then the received signal is assumed to be either media content or a user profile. Accordingly, signal content is recorded at 90 in media content data store 92 or secure offset data store 94 as indicated by memory location pointer 82. Further, a user selection 68 communicated by selection mechanism 70 is stored in non-secure offset data store 96 regardless of the current mode of device 10.

If device 10 is in operation mode as at 74, then device 10 determines whether a received signal is a key code at 98 and, if not, ignores the input at 100 and returns to 72. If, however, the received signal is a key code, then device 10 determines whether the key code signals a mode change as at 102. If so, device 10 enters program mode at 104 and receives new signals at 72. If not, device 10 identifies a memory location at 106 based on the received key code, recorded key code offsets 86, contents of secure offset data store 94, and contents of non-secure offset data store 96. It then retrieves media content from the identified location at 108 and outputs the selected portion of media content 32 via output 62 at 110.

Figure 6:
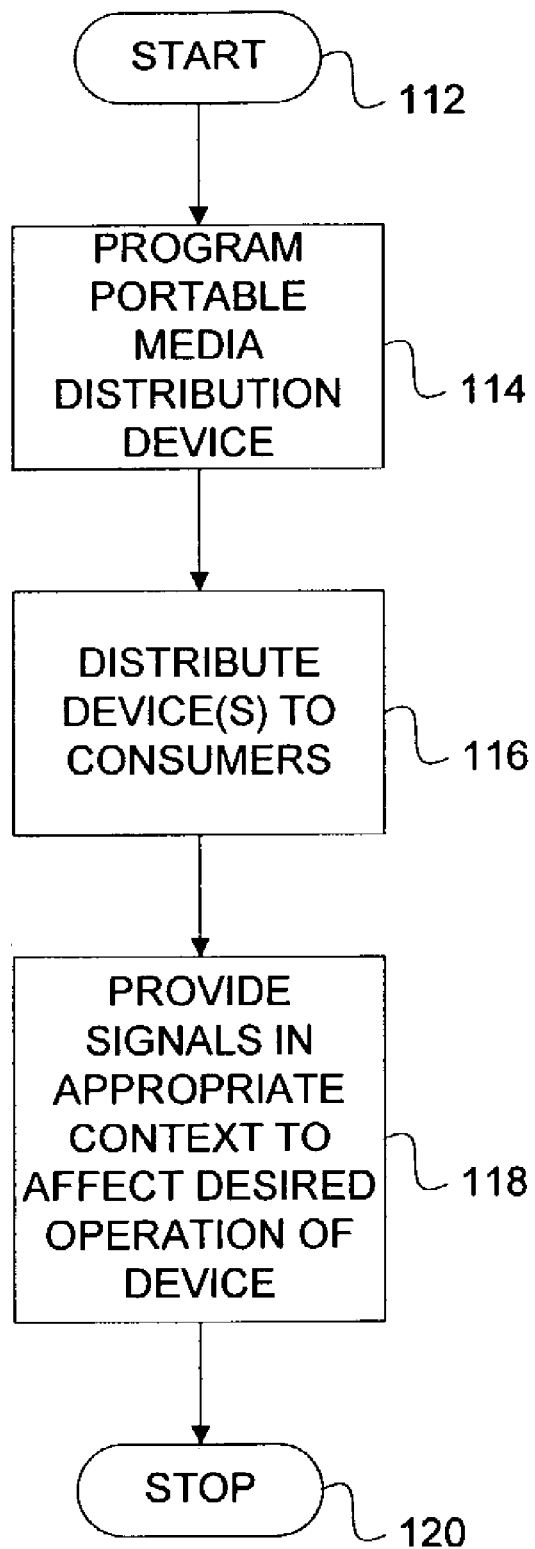
FIG. 6 is a flow diagram depicting a method of distributing media content according to the present invention.

FIG. 6 illustrates the method of distributing media content according to the present invention. Beginning at 112, the method includes storing media content in portable media distribution devices at 114, wherein the devices are operable to select portions of the media content based on wirelessly received input signals, and to communicate the selected portions to users. Thus, portions of media content are optionally authored with respect to different subjects (different times, different events, different locations or points of interest) or different audiences. The programmed devices are then distributed to users at 116 by one or more methods, including renting the portable devices to users at an entry point to an attraction. The method of distribution may also include distributing the portable devices free of charge at a convenient location, informing the users of a different location at which to use the devices, and educating the users in purpose and use of the portable devices.

The method of media content distribution further includes providing signals in an appropriate context at 118 to affect desired operation of the portable devices. Thus, the method includes disposing a signaling mechanism at a location, wherein the signaling mechanism is operable to wirelessly produce an input signal in a range respective to the location, and the input signal is selected to ensure that the selected portions of media content include information relating to the location when the portable devices are disposed within the range. The method can further include disposing additional signaling mechanisms at additional locations, wherein the additional signaling mechanisms are operable to produce additional input signals in additional ranges respective to the additional locations, and the additional input signals are selected to ensure that the selected portions of media content include information relating to the additional locations when the portable devices are disposed within the additional ranges. Finally, the method still further includes adapting the signaling mechanisms to produce different signals at different times, thereby ensuring that the selected portions of media content include information relating to the locations at particular points in time when the portable devices are disposed within the ranges. The method ends at 120.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A portable media content distribution device, comprising:
   a data store storing media content, wherein a first portion of the media content contains information about a subject relating to a point of interest and authored with respect to a first audience, and a second portion of the media content contains information about the subject relating to the point of interest and authored with respect to a second audience;
   a user profile indicator indicating whether a user is a member of the first audience or the second audience;
   a wireless input receptive of an input signal substantially originating at the point of interest and including one of plural dedicated codes for the device; and
   an output adapted to communicate a selected portion of media content stored in said data store to the user in response to receipt of the input signals and based on the user profile indicator, wherein media contents relating to different points of interest are filtered for communication to the user by the dedicated code included in the input signal,
   wherein the media content is stored in said data store before receipt of the input signal with media content for different points of interest being organized by the dedicated codes.

2. The device of claim 1, wherein said user profile indicator corresponds to a data object securely stored in said data store, thereby preventing the user from manipulating the user profile indicator during operation of the device.

3. The device of claim 2, wherein the data object is subject to being rewritten by a device programmer during a program mode of the device, and a mode switching procedure has a security measure allowing the device programmer to manipulate the user profile indicator, and preventing the user from manipulating the user profile indicator.

4. The device of claim 1, wherein said user profile indicator corresponds to a selection mechanism responsive to manipulation by the user, thereby allowing the user to manipulate the user profile indicator during an operation mode of the device.

5. The device of claim 1, wherein a first portion of the media content and the second portion of the media content contain information about a first subject, a third portion of the media content contains information about a second subject relating to a second point of interest and authored with respect to the first audience, a fourth portion of the media content contains information about the second subject relating to the second point of interest and authored with respect to the second audience, and said output is operable to select between the first subject and the second subject based on the received input signal, and operable to select between the first audience and the second audience based on said user profile indicator.

6. The device of claim 1, wherein said output includes a processor having an operation mode and a program mode, wherein the processor is adapted to communicate a selected portion of media content stored in said data store to the user in response to receipt of the input signal and based on the user profile indicator during the operation mode, and the processor is adapted to store received portions of media content in said data store during the program mode.

7. The device of claim 1, wherein said wireless input is receptive of a first input signal and a second input signal, said output is adapted to identify multiple portions of media content based on said first input signal and said second input signal, said output is adapted to communicate availability of multiple portions of media content to the user, and said output is adapted to select one of the multiple portions of media content based on a user response.

8. A media content distribution system, comprising:
a portable device operable to store media content organized by dedicated codes for the device, wirelessly receive input signals each containing a different one of the dedicated codes, select between portions of the media content based on the dedicated codes input signals, and communicate a selected portion to a user;
a wireless signaling mechanism disposed at a location and producing one of the input signals in a range respective to the location, wherein the input signal includes one of said dedicated codes selected to ensure that the selected portion of media content includes information relating to the location when the portable device is disposed within the range,
wherein the media content is stored in said portable device before receipt of the input signal with media content for different locations being organized by the dedicated codes.

9. The system of claim 8, wherein said signaling mechanism corresponds to a first signaling mechanism disposed at a first location and producing a first input signal in a first range respective to the first location, wherein the first input signal is selected to ensure that a first selected portion of media content includes information relating to the first location when the portable device is disposed within the first range, the system further comprising a second signaling mechanism disposed at a second location and producing a second input signal in a second range respective to the second location, wherein the second input signal is selected to ensure that a second selected portion of media content includes information relating to the second location when the portable device is disposed within the second range.

10. The device of claim 9, wherein the first range and the second range do not overlap, thereby ensuring that the portable device does not communicate the first selected portion of media content to the user when the portable device is disposed within the second range, and does not communicate the second portion of media content to the user when the portable device is disposed within the first range.

11. The system of claim 9, wherein the first range and the second range overlap, the portable device is operable to communicate availability of multiple portions of media content to the user when the portable device is simultaneously disposed within the first range and the second range, and to select one of the multiple portions of media content based on a user response.

12. The system of claim 8, wherein said portable device is operable to store a first portion of media content relevant to the location at a first time, and operable to store a second portion of media content relevant to the location at a second time, and said signaling mechanism is adapted to produce a first signal at the first time and a second signal at the second time, thereby ensuring that the selected portion of media content includes information relating to the location at a particular point in time when the portable device is disposed within the range.

13. The system of claim 8, further comprising a programming station responsive to manipulation by a device programmer and operable to communicate media content to said portable device, thereby storing the media content in the portable device for distribution to the user.

14. The system of claim 13, wherein said portable device is operable to store a user profile and select the portion of the media content based on the user profile, and said programming station is operable to communicate a user profile to said portable device, thereby securely storing the user profile in said portable device and preventing the user from manipulating the user profile during operation of the device.

15. The system of claim 8, wherein said portable device has a user profile indicator indicating whether a user is a member of the first audience or the second audience, and is operable to select the portion of media content based on the user profile indicator.

16. The system of claim 8, wherein said portable device has a time indicator indicating a current time, and is operable to select the portion of media content based on the time indicator.

17. A method of operation for a portable media content distribution device, comprising:
receiving an input signal substantially originating at a point of interest and including a dedicated code for the distribution device;
selecting a portion of media content stored in memory based on the dedicated code included in the input signal and based on a user profile indicating whether a user belongs to a first audience or a second audience, wherein the portion of media content contains information relating to the point of interest; and
communicating the portion of the media content to the user,
wherein the media content is stored in the memory before receipt of the input signal with media content for different locations being organized by the dedicated codes.

18. The method of claim 17, comprising receiving and storing the media content.

19. The method of claim 18, comprising:
receiving and storing a first portion of the media content containing information about a subject relating to the point of interest and authored with respect to a first audience; and
receiving and storing a second portion of the media content containing information about the subject relating to the point of interest and authored with respect to a second audience.

20. The method of claim 19, comprising differentiating between the first portion of media content and the second portion of media content based on the user profile.

21. The method of claim 18, comprising:
receiving and storing a first portion of the media content containing information about a first subject relating to a first point of interest; and
receiving and storing a first portion of the media content containing information about a second subject relating to a second point of interest.

22. The method of claim 19, comprising differentiating between the first portion of media content and the second portion of media content based on the input signal.

23. The method of claim 17, comprising receiving and storing the user profile.

24. The method of claim 18, comprising:
determining a current time; and
selecting the portion of the media content based on the current time.

25. A media content distribution method, comprising:
storing media content in portable devices operable to select portions of the media content based on dedicated codes for the devices included in wirelessly received input signals, and to communicate the selected portions to users;
distributing the portable devices to users; and
disposing a signaling mechanism at a location, wherein the signaling mechanism is operable to wirelessly produce an input signal including one of plural dedicated codes for the portable devices in a range respective to the location, and the input signal is selected to ensure that the selected portions of media content include information relating to the location when the portable devices are disposed within the range,
wherein the media content is stored in the portable devices before receipt of the input signal with media content for different locations being organized by the dedicated codes.

26. The method of claim 25, wherein said disposing a signaling mechanism at a location corresponds to disposing a first signaling mechanism at a first location, wherein the first signaling mechanism is operable to produce a first input signal in a first range respective to the first location, and the first input signal is selected to ensure that the selected portions of media content include information relating to the first location when the portable devices are disposed within the first range, the system further comprising disposing a second signaling mechanism at a second location, wherein the second signaling mechanism is operable to produce a second input signal in a second range respective to the second location, and the second input signal is selected to ensure that the selected portions of media content include information relating to the second location when the portable devices are disposed within the second range.

27. The method of claim 26, further comprising selecting the first range and the second range to ensure that the first range and the second range do not overlap, thereby ensuring that the portable devices do not communicate information relating to the first location to the user when the portable devices are disposed within the second range, and do not communicate information relating to the second location to the user when the portable devices are disposed within the first range.

28. The method of claim 26, further comprising:
communicating availability of multiple portions of media content relating to the first location and the second location to users when the portable devices are simultaneously disposed within the first range and the second range;
receiving user responses; and
selecting from among the multiple portions of media content based on the user responses.

29. The method of claim 25, wherein said storing media content in portable devices includes storing a first portion of media content relevant to the location at a first time, and storing a second portion of media content relevant to the location at a second time, and wherein said disposing the signaling mechanism at the location includes adapting the signaling mechanism to produce a first signal at the first time and a second signal at the second time, thereby ensuring that the selected portions of media content includes information relating to the location at a particular point in time when the portable devices are disposed within the range.

30. The method of claim 25, further comprising:
securely storing user profiles in the portable devices, thereby preventing users from manipulating the user profiles during operation of the portable devices; and
selecting the portions of the media content based on the user profiles.

31. The method of claim 25, further comprising:
providing selection mechanisms to the portable devices;
using said selection mechanisms to provide user profiles indicating whether users are members of a first audience or a second audience, thereby rendering the user profiles responsive to user manipulation; and
selecting the portions of media content based on the user profiles.

32. The method of claim 25, further comprising:
providing time keeping mechanisms operable to report a current time to the portable devices; and
selecting the portions of media content based on the current time.

33. The method of claim 25, wherein said distributing the portable devices to users includes renting the portable devices to users at an entry point to an attraction.

34. The method of claim 25, wherein said distributing the portable devices to users includes:
distributing the portable devices free of charge at a second location;
informing the users of the location; and
educating the users in purpose and use of the portable devices.

* * * * *